United States Patent
Wachi

(10) Patent No.: US 10,290,082 B2
(45) Date of Patent: May 14, 2019

(54) IMAGE PROCESSING APPARATUS, IMAGING APPARATUS, IMAGE PROCESSING METHOD, AND STORAGE MEDIUM FOR PERFORMING A RESTORATION PROCESS FOR AN IMAGE

(71) Applicant: CANON KABUSHIKI KAISHA, Tokyo (JP)

(72) Inventor: Fumihito Wachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/677,135

(22) Filed: Aug. 15, 2017

(65) Prior Publication Data

US 2018/0061019 A1    Mar. 1, 2018

(30) Foreign Application Priority Data

Aug. 23, 2016  (JP) .................................. 2016-162752
Jun. 14, 2017  (JP) .................................. 2017-116375

(51) Int. Cl.
*H04N 5/357* (2011.01)
*G06T 5/00* (2006.01)
*G06T 5/20* (2006.01)

(52) U.S. Cl.
CPC ................ *G06T 5/003* (2013.01); *G06T 5/20* (2013.01); *H04N 5/357* (2013.01); *H04N 5/3572* (2013.01)

(58) Field of Classification Search
CPC .................................................... H04N 5/357

USPC ................................................ 348/241, 231.6
See application file for complete search history.

(56) References Cited

U.S. PATENT DOCUMENTS

| 6,702,483 B2 | 3/2004 | Tsuboi et al. |
| 8,416,335 B2 | 4/2013 | Watanabe |
| 8,749,692 B2 | 6/2014 | Watanabe |
| 2003/0035090 A1* | 2/2003 | Imai ........................ G03B 27/42 355/53 |
| 2012/0162485 A1* | 6/2012 | Okada ................... H04N 1/4092 348/241 |

FOREIGN PATENT DOCUMENTS

| JP | 2001-228307 A | 8/2001 |
| JP | 2012-073691 A | 4/2012 |

* cited by examiner

*Primary Examiner* — Joel W Fosselman
(74) *Attorney, Agent, or Firm* — Venable LLP

(57) ABSTRACT

An image processing apparatus includes a memory configured to store a plurality of image restoration filters depending on an F-number, and at least one processor coupled to the memory, and serving as an acquirer configured to acquire a plurality of first image restoration filters according to an imaging condition from among the plurality of image restoration filters, and an image restorer configured to perform a restoration process for an image through a predetermined calculation process based on the plurality of first image restoration filters. The image is obtained via an imaging optical system that includes an optical element having a transmittance distribution where a transmittance continuously changes in at least a partial area.

19 Claims, 11 Drawing Sheets

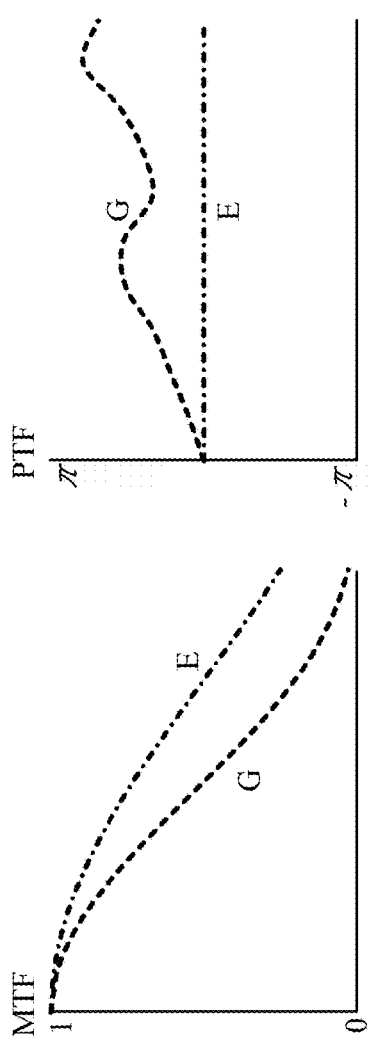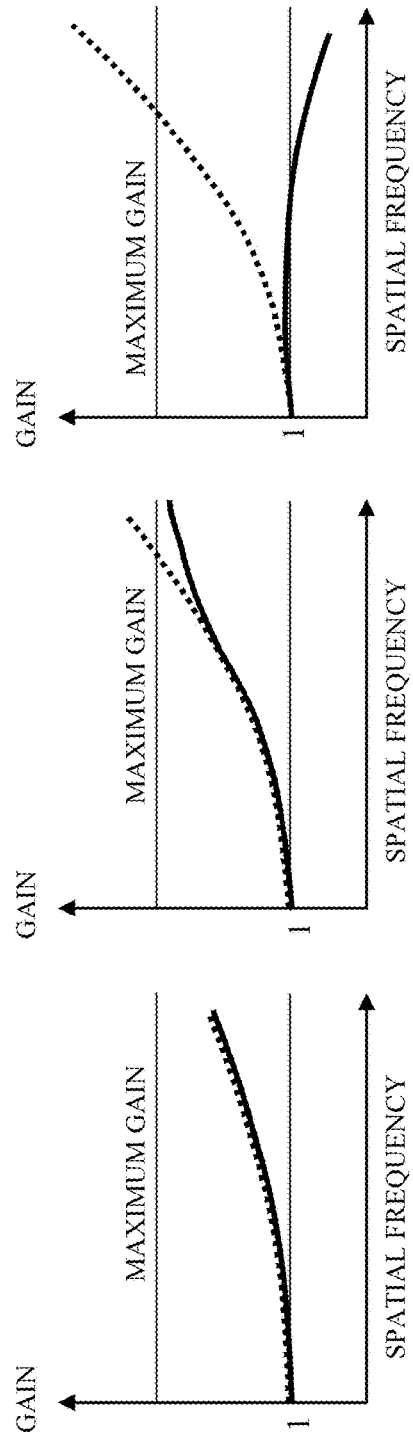

IMAGE PROCESSING APPARATUS, IMAGING APPARATUS, IMAGE PROCESSING METHOD, AND STORAGE MEDIUM FOR PERFORMING A RESTORATION PROCESS FOR AN IMAGE

This application claims the benefit of Japanese Patent Application No. 2016-162752, filed on Aug. 23, 2016, and Japanese Patent Application No. 2017-116375, filed on Jun. 14, 2017, each of which is hereby incorporated by reference herein in its entirety.

BACKGROUND OF THE INVENTION

Field of the Invention

The present invention relates to an image processing apparatus configured to correct changes of the image quality caused by a characteristic of an optical element.

Description of the Related Art

A captured image obtained by an imaging apparatus is degraded by a diffractive phenomenon depending on an F-number even when aberrations in an imaging optical system are highly accurately corrected, such as a spherical aberration, a coma, a curvature of field, and a distortion.

FIG. 2 illustrates a diffraction limit curve, where an abscissa axis denotes a spatial frequency and an ordinate axis denotes a modular transfer function (MTF). As illustrated in FIG. 2, as the F-number increases, the cutoff frequency shifts to the low frequency side. For example, a Nyquist frequency of an image sensor with a pixel size of 4 µm is 125 cycles/mm. Thus, in a bright situation, such as F2.8, the influence is small. In a dark situation, however, such as F11 and F22, the influence increases. The diffraction phenomenon can be described similar to the aberration by a point spread function ("PSF") and an optical transfer function ("OTF"). Thus, a blur caused by the diffraction can be corrected by the above image restoration process.

The blur component in the image caused by the aberration and the diffraction means that a light flux emitted from one point in an object again that is to converge into one point on an image plane is spread where there is no influences of the aberration or the diffraction, and is expressed by the PSF. The OTF, obtained by Fourier-transforming the PSF, has frequency component information of the aberration and is expressed by a complex number. An absolute value of the OTF, or an amplitude component, is referred to as the MTF, and a phase component is referred to as a phase transfer function ("PTF"). The MTF and the PTF are frequency characteristics of the amplitude component and the phase component, respectively, in an image degraded by the aberration, and are expressed as follows, with a phase angle as the phase component:

$$PTF = \tan^{-1}(\operatorname{Im}(OTF)/\operatorname{Re}(OTF)).$$

Herein, Re(OTF) and Im(OTF) are a real part and an imaginary part, respectively, in the OTF. One conventional method for correcting the degraded MTF and PTF uses information of the OTF in the imaging optical system. A process for correcting a degraded captured image with the information of the OTF in the imaging optical system will be referred to as an image restoration process hereinafter. One conventional image restoration method is a convolution method to an input image with a function (image restoration filter) having an inverse characteristic of the OTF. It is necessary for an effective image restoration process to more accurately obtain the OTF information in the imaging optical system. The OTF can be obtained through a calculation, for example, based on designed value information of the imaging optical system. The OTF can also be calculated by capturing a point light source and by Fourier-transforming its intensity distribution. Moreover, the OTF can also be found for the diffraction based on an ideal equation.

Next follows a description of a diffraction in which an imaging optical system includes an optical element or an apodizing filter ("APD"). Assume that the optical element has a transmittance that continuously changes toward the central part on a transparent member as a substrate and is provided in the optical path in the imaging optical system. At this time, an image blur component caused by the diffraction in the imaging optical system that has no optical element and an image blur component caused by the diffraction in the imaging optical system that has the optical element are different from each other. Hence, in order to properly correct the image blur component caused by the aberration and diffraction in the imaging optical system that has the optical element, it is necessary to calculate the OTF using the calculation, for example, based on the designed value information of the optical element and the imaging optical system.

Japanese Patent Laid-Open No. ("JP") 2012-73691 discloses a method for converting and storing the OTF into a coefficient for the image restoration and for performing an image restoration process for a degraded image caused by the aberration and the diffraction in the imaging apparatus for a variety of imaging conditions. JP 2012-73691 is silent, however, about the OTF where the imaging optical system has the optical element. Even when an aperture opening diameter, an imaging distance, and a focal length in a zoom lens are the same, the OTF is different between the imaging optical system having the optical element in its optical system and the imaging optical system having no optical element in its optical system. In addition, even when the image height is the same in the image, the OTF is different between the imaging optical system having the optical element in its optical system and the imaging optical system having no optical element in its optical system. The highly accurate OTF data is to be stored for each of the two conditions in which the imaging optical system has the optical element in its optical system and the imaging optical system has no optical element in its optical system, and requires a huge amount of data. In performing the image restoration process for one image, the OTF depending on the image height is to be used and a calculational amount increases.

JP 2001-228307 discloses a method for making variable the apodization effect of the optical element. JP 2001-228307 does not disclose, however, a method for highly accurately performing the image restoration process for the diffraction caused by the apodization effect.

SUMMARY OF THE INVENTION

The present invention provides an image processing apparatus, an imaging apparatus, an image processing method, and a storage medium, each of which can reduce a data amount and provide a highly accurate image restoration process.

An image processing apparatus according to one aspect of the present invention includes a memory configured to store a plurality of image restoration filters depending on an F-number, an acquirer configured to acquire a plurality of first image restoration filters according to an imaging condition from among the plurality of image restoration filters, and an image restorer configured to perform a restoration process for an image through a predetermined calculation process based on the plurality of first image restoration filters, the image being obtained via an imaging optical system that includes an optical element that is configured to change a transmittance.

Further features of the present invention will become apparent from the following description of exemplary embodiments with reference to the attached drawings.

BRIEF DESCRIPTION OF THE DRAWINGS

FIGS. 5A and 5B are explanatory views of an amplitude component and a phase component in an optical transfer function according to each embodiment.

FIGS. 6A to 6C are relational views of a gain characteristic of an inverse filter of the OTF and a gain characteristic of the image restoration filter according to each embodiment.

DESCRIPTION OF THE EMBODIMENTS

Figure 1:
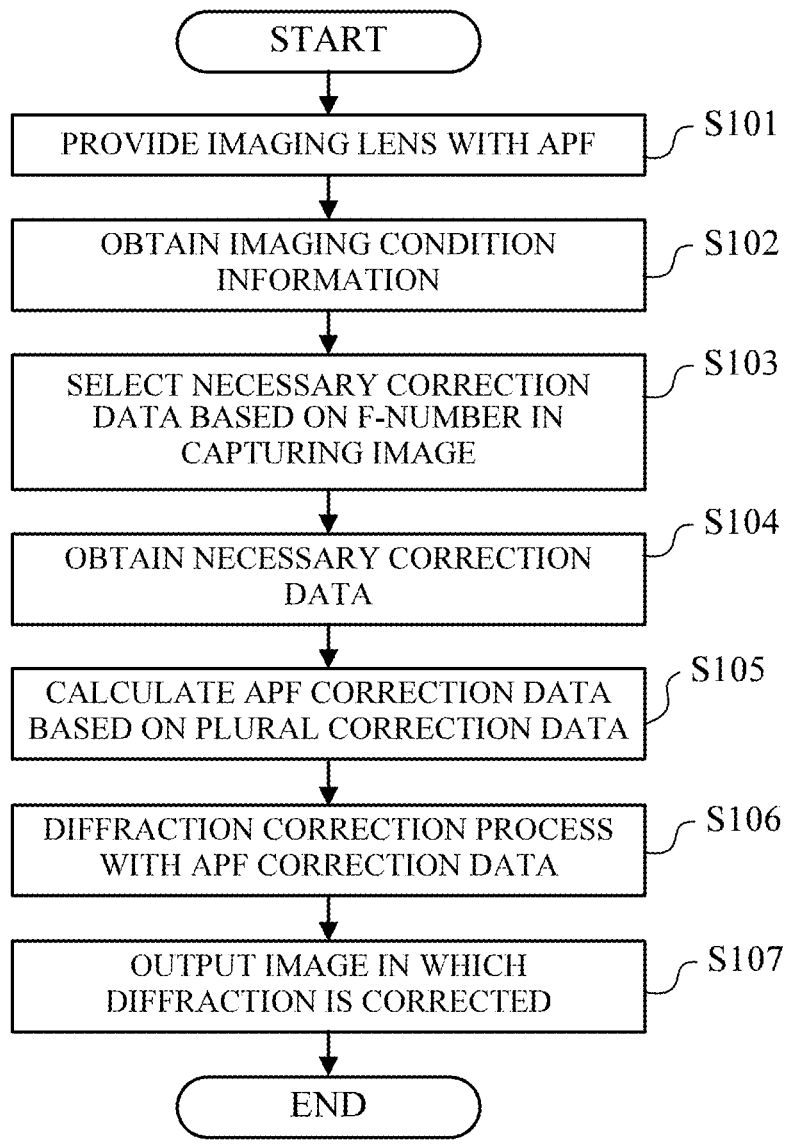
FIG. 1 is a flowchart of an image restoration process according to a first embodiment.
Figure 2:
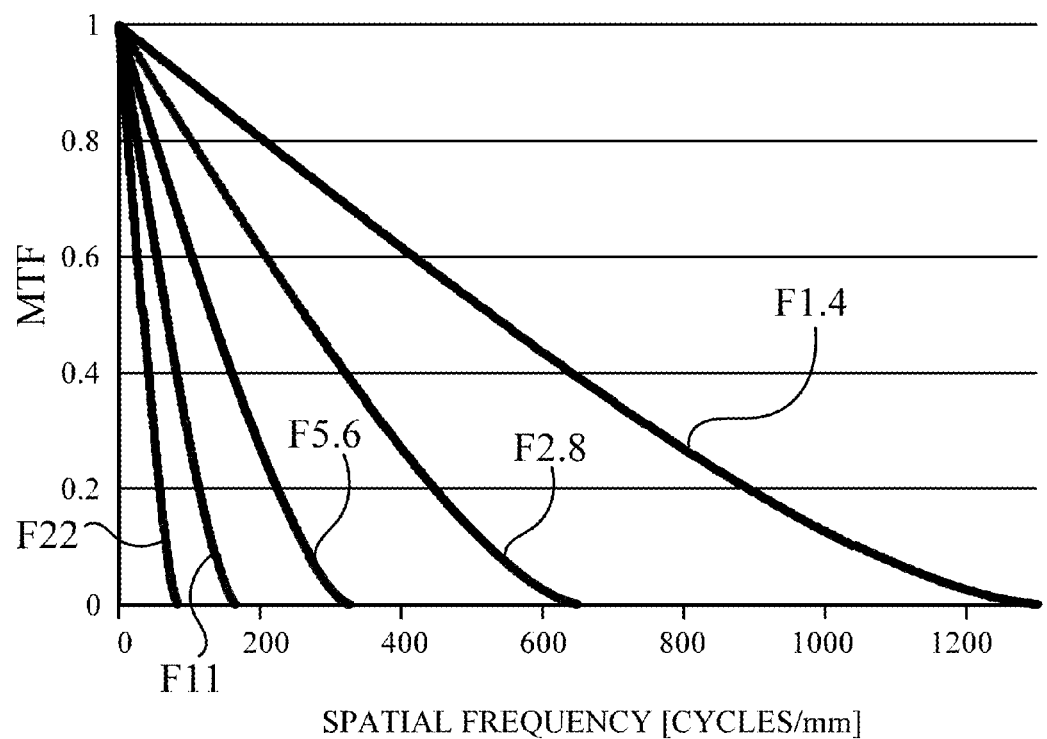
FIG. 2 is an explanatory view of a diffraction limit curve.

Referring now to the accompanying drawings, a detailed description will be given of embodiments of the present invention, and of a definition of a term and an image restoration process (image processing method) described in the embodiments. An image processing method, as used herein, is properly used for each embodiment, and will also be described.

Input Image

An input image is a digital image (captured image) that is obtained as a result of an image sensor receiving light via an imaging optical system and an optical element, and that is degraded by an OTF of an aberration in the imaging optical system that includes a lens and a variety of optical filters, and an OTF by a diffraction of the optical element. The imaging optical system includes a lens and a mirror (reflective surface) having a curved surface. The input image is, for example, a RAW image having information of RGB color components, but the input image is not limited to this example. The input image and an output image may contain an imaging condition, such as the existence of the optical element, a focal length of the lens, an F-number, an imaging distance, and various types of correction information for correcting the input image.

Image Restoration Process

Next follows a description of a summary of the image restoration process. The following expression (1) is established, in which g(x, y) is a degraded image (captured image), f(x, y) is an original image, and h(x, y) is a PSF as a Fourier pair of the OTF:

$$g(x,y)=h(x,y)*f(x,y) \quad (1).$$

In the expression (1), * is a convolution, and (x, y) is a coordinate on the captured image.

When the expression (1) is Fourier-transformed to a frequency plane in a display form, the expression (2) is expressed as a product for each frequency:

$$G(u,v)=H(u,v) \cdot F(u,v) \quad (2).$$

In the expression (2), H is the OTF obtained by Fourier-transforming the PSF(h), and G and F are functions obtained by Fourier-transforming the degraded image g and the original image f, respectively. (u, v) is a coordinate on the two-dimensional frequency plane, or the frequency.

In order to obtain the original image f based on the captured degraded image g, both sides in the expression (2) may be divided by the optical transfer function H, as illustrated in the expression (3):

$$G(u,v)/H(u,v)=F(u,v) \quad (3).$$

Then, F(u, v) or G(u, v)/H(u, v) is inversely Fourier-transformed into a real plane, and the original image f(x, y) is obtained as a restored image.

When R is inversely Fourier-transformed $H^{-1}$, the original image f(x, y) can be obtained by a convolution process to the image on the real plane, as illustrated in the expression (4):

$$g(x,y)*R(x,y)=f(x,y) \quad (4).$$

Herein, R(x, y) is referred to as an image restoration filter. For the image as a two-dimensional image, the image restoration filter R generally has a tap (cell) corresponding to each pixel on the image, and a distribution of a two-dimensional filter value. As the tap number (cell number) on the image restoration filter R increases, a restoration accuracy increases. Hence, the feasible tap number is set according to a required image quality, an image processing ability, a PSF spread breadth, an aberrational characteristic, etc. The image restoration filter R needs to reflect at least the aberration and diffraction characteristics, and thus, the image restoration filter R is different from the conventional edge emphasis filter (high-pass filter) with three taps both in the horizontal and vertical directions. Since the image restoration filter R is set based on the OTF, the degradations in both of the amplitude component and the phase component can be highly accurately corrected.

Since the actual image contains a noise component, the image restoration filter R prepared with the inverse of the OTF, as described above, can restore the degraded image and significantly amplify the noise component. This is because the MTF is increased and returned to one over the whole frequencies if the MTF (amplitude component) in the optical system is normalized to one where the noise amplitude is added to the amplitude component in the image.

Although the MTF can be returned to one as the degraded amplitude in the optical system, the noise power spectrum is also increased, and the noise is consequently amplified according to the degree (restoration gain) by which the MTF is increased.

Due to the contained noises, therefore, a good image cannot be obtained as an image to be appreciated. This is expressed by the following expressions (5-1) and (5-2), in which N is a noise component:

$$G(u,v)=H(u,v)\cdot F(u,v)+N(u,v) \qquad (5\text{-}1), \text{and}$$

$$G(u,v)/H(u,v)=F(u,v)+N(u,v)/H(u,v) \qquad (5\text{-}2).$$

For an image containing the noise component N, the restoration degree may be controlled based on a signal to noise ratio SNR between the image signal and the noise signal, for example, as in a Wiener filter expressed in the following expression (6):

$$M(u, v) = \frac{1}{H(u, v)} \frac{|H(u, v)|^2}{|H(u, v)|^2 + SNR^2} \qquad (6)$$

In the expression (6), M(u, v) is a frequency characteristic of the Wiener filter, and |H(u, v)| is an absolute value (MTF) of the OTF. In this embodiment, M(u, v) corresponds to the frequency characteristic in the image restoration filter. This method reduces the restoration gain (restoration degree) as the MTF is lesser, and increases the restoration gain as the MTF is greater. In general, the MTF in the imaging optical system is higher on the low frequency side and lower on the high frequency side, and thus, this method substantially reduces the restoration gain on the high frequency side of the image.

FIGS. 6A to 6C schematically illustrate this method. The SNR term in the expression (6) changes the gain characteristic in the image restoration filter. Hence, the following expression (7) is used in which a parameter C for controlling the restoration gain (restoration degree) is used for the SNR term:

$$M(u, v) = \frac{1}{H(u, v)} \frac{|H(u, v)|^2}{|H(u, v)|^2 + C} \qquad (7)$$

In the expression (7), when C=0, M(u, v) corresponds to the inverse filter (inverse of the MTF) of the OTF, and the gain of the image restoration filter lowers as C increases. When C>|H(u, v)|−|H(u, v)|² is satisfied, the gain of the image restoration filter decreases to one or less, as schematically illustrated in FIGS. 6A to 6C.

FIGS. 6A to 6C are relational views between the gain characteristic of the inverse filter of the OTF and the gain characteristic of the image restoration filter. In FIGS. 6A to 6C, the ordinate axis denotes a gain, and the abscissa axis denotes a spatial frequency. In FIGS. 6A to 6C, a dotted line denotes the gain characteristic of the inverse filter in the OTF, and a solid line denotes the gain characteristic in the image restoration filter. When the F-number Fn is smaller than a predetermined value Th1 (Fn<Th1), the gain in the image restoration filter does not become larger than a predetermined maximum gain and C can be set to 0. Thus, the inverse of the MTF (or the gain of the inverse filter in the OTF) coincides with the gain of the image restoration filter (FIG. 6A). When the F-number Fn is equal to or larger than the predetermined value Th1 and smaller than a predetermined value Th2 (Th1≤Fn<Th2), the gain of the inverse filter on the high frequency side is larger than the predetermined maximum gain. Hence, as C is made larger, the gain of the image restoration filter on the high frequency side is restrained (FIG. 6B). When the F-number Fn is equal to or larger than Th2 (Th2≤Fn) and C>|H(u, v)|−|H(u, v)|² is satisfied, the gain of the image restoration filter decreases to one or less (FIG. 6C). The predetermined values Th1 and Th2 (F-numbers) are determined based on a pixel pitch on the image sensor, a characteristic of an optical low-pass filter disposed in front of the image sensor, a maximum value of the restoration gain (restoration degree) of the image restoration filter, the parameter C for controlling the restoration gain (restoration degree), etc.

Figure 8:
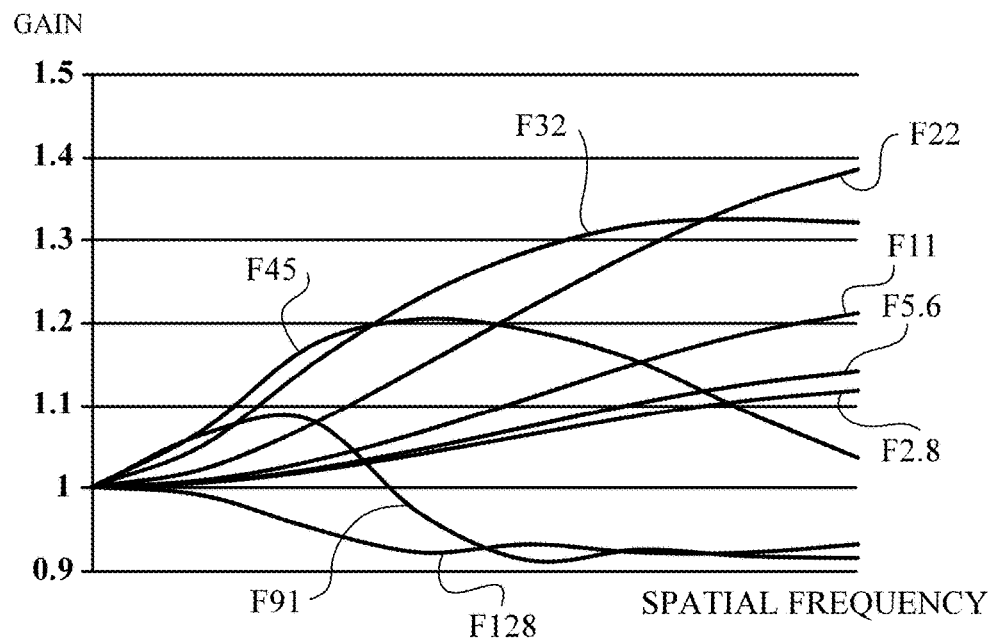
FIG. 8 is the gain characteristic in the image restoration filter according to each embodiment.

FIG. 8 illustrates a gain characteristic of an image restoration filter according to this embodiment. In FIG. 8, the ordinate axis denotes a gain, and the abscissa axis denotes a spatial frequency. This embodiment sets the maximum gain of the image restoration filter to 1.5, and the pixel pitch on the image sensor to 6 μm. Up to F22, the gain of the image restoration filter monotonously increases. In F32, the maximum gain set to 1.5 restrains the gain on the high frequency side. In F91, the gain on the low frequency side is at least one, although there is an image restoration effect, and the gain on the high frequency side is one or less. In F128, this filter cannot be used since the gain is one or less over the entire frequency region and the image restoration effect cannot be obtained.

As discussed, the tendency of the gain characteristic of the image restoration filter significantly changes according to the F-number. A data amount of the image restoration filter can be reduced when the following method determines an image restoration filter in the imaging apparatus based on this tendency.

Figure 3:
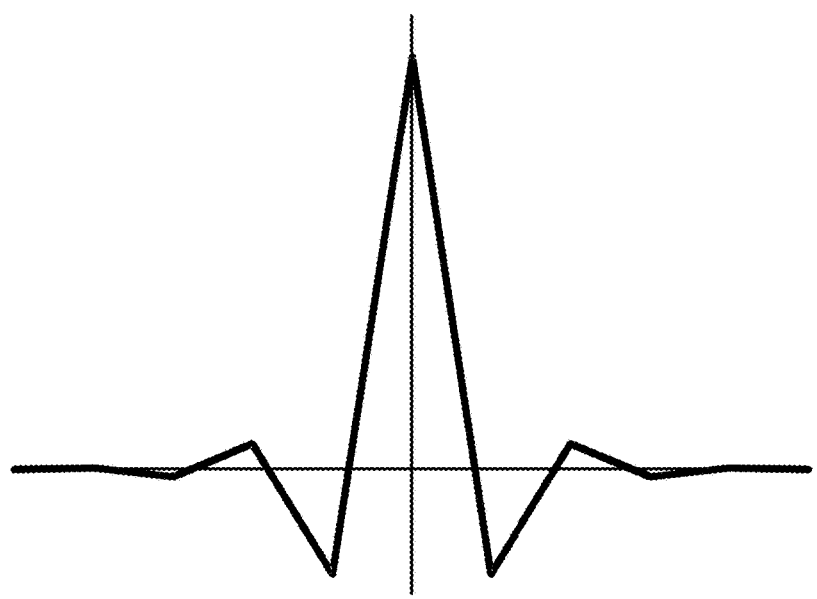
FIG. 3 is an explanatory view of an image restoration filter according to each embodiment.

Referring now to FIG. 3, a description will be given of the image restoration filter. FIG. 3 illustrates one section of the image restoration filter. The tap number in the image restoration filter depends on the PSF spread caused by the aberration and diffraction in the imaging optical system and the required restoration accuracy. The image restoration filter in this embodiment has a two-dimensional filter with 11×11 taps. The present invention is not limited, however, to this example, and a greater tap number may be used based on a relationship between the PSF spread breadth and the pixel pitch. A distribution of tap values (coefficient values) on the image restoration filter serves to ideally return the signal value or the pixel value spatially spread by the aberration to the original one point. When a diaphragm causes an approximately rotationally symmetrical diffraction, the PSF caused by the diffraction is rotationally symmetrical. Hence, a sectional shape of the image restoration filter is symmetrical, as illustrated in FIG. 3.

Each tap in the image restoration filter receives a convolution process in the image restoration process for each pixel on the image. In the convolution process, in order to improve a signal value of a predetermined pixel, the predetermined pixel is accorded with the center of the image restoration filter. A product between the signal value in the image and each tap value in the image restoration filter is calculated for each corresponding pixel between the image and the image restoration filter, and a total sum is replaced with the signal value of a central pixel.

Figure 4A:
FIGS. 4A and 4B are explanatory views of a PSF according to each embodiment.
Figure 4B:
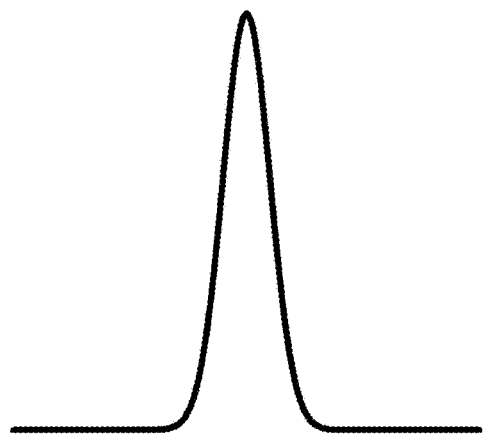

Referring now to FIGS. 4A, 4B, 5A, and 5B, a description will be given of the image restoration process in the real space and a characteristic in the frequency space. FIGS. 4A and 4B are explanatory views of the PSF, FIG. 4A illustrates the PSF before the image is restored, and FIG. 4B illustrates the PSF after the image is restored. FIGS. 5A and 5B are explanatory views of the amplitude component MTF (FIG. 5A) and the phase component PTF (FIG. 5B) in the OTF. A broken line (G) in FIG. 5A denotes the MTF before the image is restored, and an alternate long and short dash line (E)) denotes the MTF after the image is restored. In FIG. 5B, a broken line (G) denotes the PTF before the image is restored, and an alternate long and short dash line (E) denotes the PTF after the image is restored. As illustrated in FIG. 4A, the PSF before the image is restored has an asymmetrical spread under the influence of the aberration, and the PTF has a nonlinear value relative to the frequency due to this asymmetry. The image restoration process amplifies the amplitude component MTF and zeros the phase component PTF, and thus, the PSF after the image is restored becomes symmetrical and sharp, as shown in FIG. 4B.

In a case in which the diaphragm causes the diffraction to be approximately rotationally symmetrical, the PSF caused by the diffraction is rotationally symmetrical. Thus, the broken line E in FIG. 5B becomes 0. In other words, the diffraction in this embodiment has no phase shift. Irrespective of whether there is a phase shift, the above image restoration principle works, and the image restoration process is effective to this embodiment in which the diffraction is to be corrected.

Hence, the image restoration filter can be obtained by inversely Fourier-transforming the designed function based on the inverse function of the OTF in the imaging optical system. The image restoration filter used for this embodiment is properly variable, and may use the Wiener filter, for example. When the Wiener filter is used, the expression (6) is inversely Fourier-transformed so as to produce the image restoration filter in the real space with which the image is actually convoluted.

The OTF changes according to the image height (image position) in an image capturing system even in one imaging state (imaging condition). Hence, the image restoration filter is used depending on the image height. As the F-number increases, the OTF in which the influence of the diffraction is dominant can be treated as the OTF that is uniform or constant to the image height in a case in which the influence of the vignetting in the optical system is small.

In this embodiment, the diffraction (diffractive blur) is to be corrected. The imaging optical system in this embodiment includes the optical element (apodizing filter: APF). Hence, the image restoration filter depends on the F-number, a light wavelength, and the image height (image position) in a case in which the F-number is small. Hence, the image restoration filter that is uniform or constant in one image cannot be used. In other words, the image restoration filter according to this embodiment uses the OTF (first OTF) influenced by the diffractive blur that depends on the F-number, and is generated by a calculation. The calculation method of the image restoration filter will be described later. The OTFs at a plurality of wavelengths are calculated, and the OTF can be generated for each color component by weighting each wavelength based on the conceived spectrum characteristic of a light source and light receiving sensitivity information of the image sensor. Alternatively, the OTF may be calculated with a representative wavelength for each predetermined color component. The image restoration filter may be generated based on the OTF for each color component.

Figure 12:
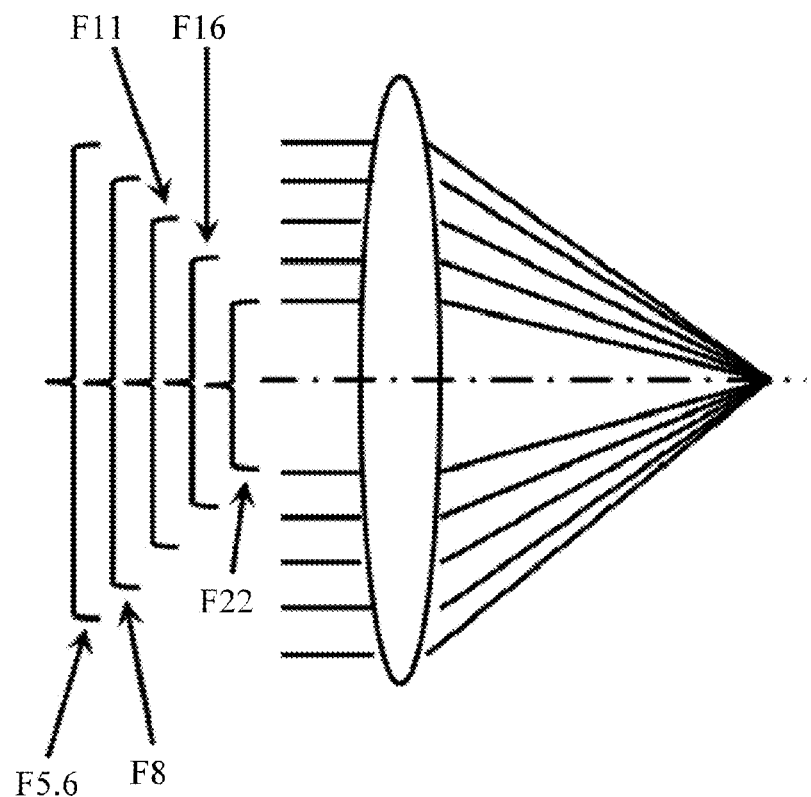
FIG. 12 is a schematic view of on-axis light ray heights depending on an F-number.

Next follows a description of the calculation method of the image restoration filter. The center of the optical element (APF), having a transmittance in which the concentration continuously changes towards the central part where the transparent member is set to the substrate, is disposed at the position that overlaps an optical axis center in the imaging optical system. It is ideal to dispose the optical element near the diaphragm in the imaging optical system, but the optical element may be disposed at another position. For example, assume that the open F-number in the imaging optical system is 5.6. The height of a light ray that axially forms a point image is determined by the F-number and the position of the optical element. At this time, for example, assume that the minimum F-number is 22, and the height on the on-axis light ray lowers as the F-number changes from 5.6 to 22. A change of the F-number is divided into a plurality of stages, such as the F-numbers of 5.6, 8, 11, 16, and 22. FIG. 12 is a schematic view illustrating that the height of the on-axis light ray depends on the F-number.

Figure 13:
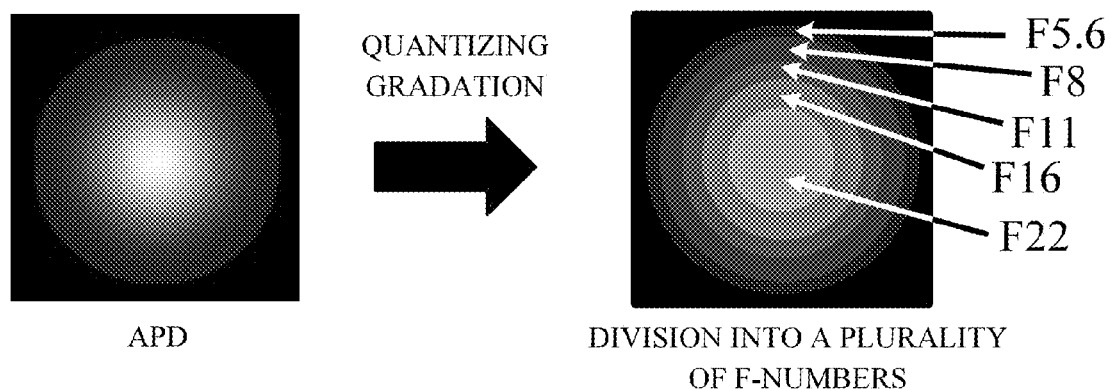
FIG. 13 is a schematic view for quantizing an apodizing filter concentration according to each embodiment.

Next, the light ray height corresponds to the concentration change (transmittance distribution) in the optical element (APF). In other words, the concentration (transmittance) at the light ray height is quantized or digitized for each light ray height. FIG. 13 is a schematic view for quantizing the concentration of the optical element. The optical element has a transmittance in which the concentration continuously changes towards the central part where the transparent member is set to the substrate. Hence, the continuity is quantized and the step is set to the light ray height that fits each F-number.

Herein, the image restoration filter for each F-number will be described. The light ray for the F-number of 5.6 has the highest height among the F-numbers 5.6, 8, 11, 16, and 22. However, since the diffraction depends on the diaphragm diameter, the image restoration filter for the F-number of 5.6 does not contain the image restoration filter for another F-number. In order to produce the image restoration filter that executes the step of quantizing the concentration of the optical element, it is necessary to consider the image restoration filters for all quantized F-numbers. In this embodiment, the image restoration filters that contain all F-numbers of 5.6, 8, 11, 16, and 22 are those of the images captured with the imaging optical system that includes the optical element. Hence, the image restoration filters for the respective F-numbers are summed up, for example, and the image restoration filter having the averaged response is the image restoration filter used to correct the diffraction where the optical element is disposed in the optical path.

Now, the summation and the average will be described in detail. In the ideal correction to the diffraction in the on-axis light flux, the image restoration filter can be produced with the simple summation and average of the ideal correction values. Where the image restoration filter is produced based on other circumstances, for example, a high spatial frequency component in the image restoration filter can be intentionally reduced and summed up in order to restrain the excessive correction of the high frequency. Instead of simple averaging, for example, an image restoration filter to be averaged may be weighted so as to make effective the image restoration filter for the F-number.

Hence, this embodiment that is to correct only the diffraction previously stores a plurality of image restoration filters depending on the F-number, and calculates the plurality of image restoration filters depending on the imaging condition. Then, this embodiment can perform image processing for reducing the image degradation caused by the diffraction with the image restoration filter in which the image degradation caused by the diffraction is calculated where the imaging optical system includes the optical element. When the imaging optical system does not include the optical element, the influence of the diffraction is calculated based on the diameter, the sectional shape, and the dimension of the off-axis light flux, and the image restoration filter corresponding to the influence may be prepared and corrected. Without a real harm, the image restoration filter of the on-axis light flux may be used for that for the off-axial light flux.

Next follows a description of the off-axis light flux. A description will now be given where the imaging optical system includes the optical element. When the on-axis light flux has a height that is effected by the concentration in the optical element, this embodiment previously holds a plurality of image restoration filters depending on the F-number for the on-axis light flux, and calculates the plurality of image restoration filters depending on the imaging condition. Then, this embodiment processes the degradation of the image by utilizing the image restoration filter that is calculated in which the degradation caused by the diffraction is calculated where the imaging optical system includes the optical element. In other words, the image restoration filter can be prepared for the off-axis light flux similar to that for the on-axis light flux.

Next follows a description of an individual case in which the off-axis light flux determines the light ray height. When the off-axis light flux determines the light ray height other than the diaphragm, the concentration is quantized depending on the area in which the off-axis light flux transmits in the optical element, and the plurality of image restoration filters are calculated. The image restoration filter is used for processing, in which the image degradation caused by the diffraction is calculated where the imaging optical system includes the optical element. When the off-axis light flux determines the light ray height with the diaphragm, the process similar to the on-axis light flux processing method may be used for the image restoration.

Figure 14:
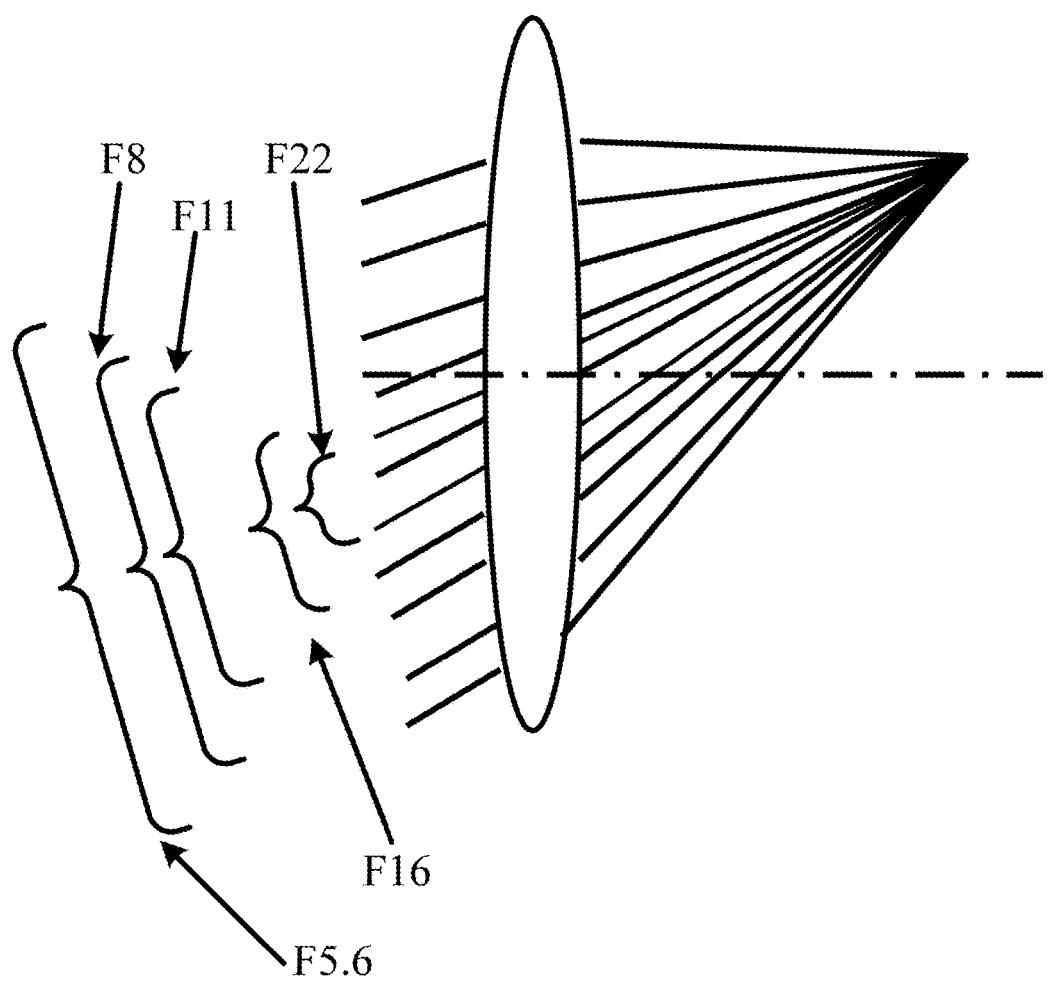
FIG. 14 is a schematic diagram of an off-axis light flux according to each embodiment.

FIG. 14 is a schematic view of the off-axis light flux. In this example, where ray tracing of the off-axis light flux is illustrated in the schematic view similar to FIG. 12, the light ray height that passes the imaging optical system is approximately equivalent to that of the on-axis light flux. At this time, when the light ray height that passes the APF is approximately equivalent, the influence of the concentration is approximately equivalent. Hence, the image restoration filter for correcting the off-axis light flux is equivalent with the case in which the on-axis light flux is to be corrected.

Figure 7:
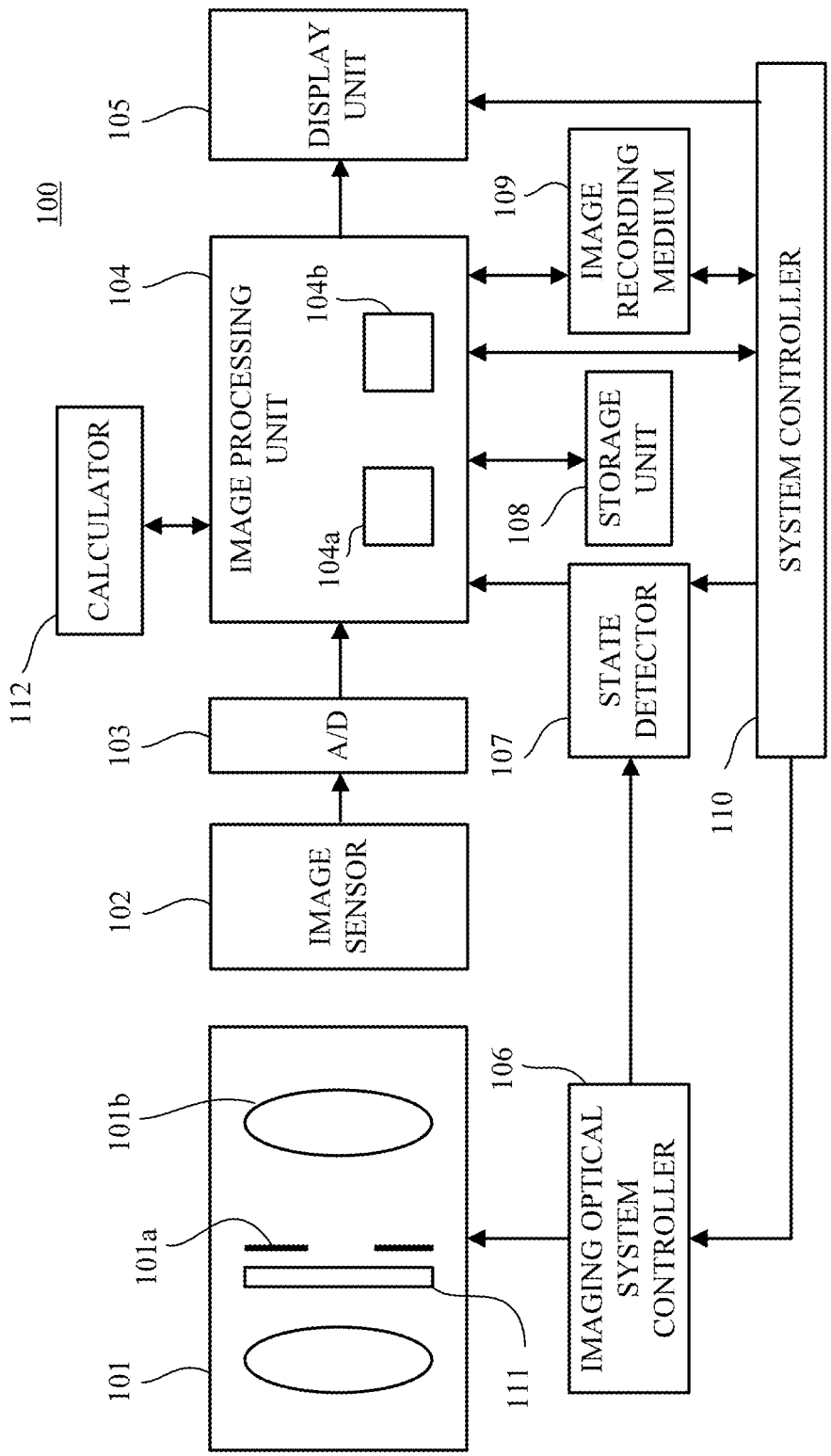
FIG. 7 is a configuration diagram of an imaging apparatus according to each embodiment.

Referring now to FIG. 7, a description will be given of the imaging apparatus according to this embodiment. FIG. 7 is a configuration diagram of the imaging apparatus 100 according to this embodiment. The imaging apparatus 100 can generate a restored image (output image) from a captured image (input image) by performing the following image processing method (image restoration process using the image restoration filter).

In the imaging apparatus 100, the object image is formed on the image sensor 102 via the imaging optical system 101. The imaging optical system 101 includes a diaphragm (aperture stop) 101a, a focus lens 101b, and an apodizing filter (APF) 111. The diaphragm 101a adjusts a light quantity on the image sensor 102 by changing the aperture diameter and by controlling the F-number. The focus lens 101b provides focusing based on an object distance, and thus, an unillustrated autofocus (AF) mechanism and a manual focus mechanism control the position of the focus lens 101b in an optical axis direction.

The APF 111 (optical element) is a transmittance distribution filter (gradation type ND filter) having a predetermined transmittance distribution so as to change the light amount distribution of the blur image of the object (or so as to control the blur image). In other words, the APF 111 satisfies the conditional expression $T(r1) \geq T(r2)$, where $T(r1)$ and $T(r2)$ are transmittances with distances r1 and r2 ($r1 < r2$) in the radial direction (in the direction orthogonal to an optical axis) from the center on an optical plane. In other words, APF 111 has a transmittance distribution in which the transmittance continuously decreases as a position is separated from the optical axis. The APF 111 may have a transmittance distribution on its partial area, however, that does not satisfy the above conditional expression, or the APF 111 may have a transmittance distribution in which it is evaluated that the conditional expression is substantially satisfied as a whole. When the imaging optical system 101 includes the APF 111, a high-quality blur image can be obtained due to the apodizing effect.

The image sensor 102 includes a CCD sensor, a CMOS sensor, etc., photoelectrically converts the object image (optical image) formed by the imaging optical system 101, and outputs image data (or an analog image signal). The object image formed on the image sensor 102 is converted into an electric signal and output to an A/D converter 103. The A/D converter 103 converts the input electric signal (analog image signal) into a digital image signal, and outputs the digital image signal to an image processor 104. Due to the above process, a captured image is obtained.

The image processor 104 performs the predetermined process and the image restoration process. Initially, the image processor 104 obtains the imaging condition (imaging condition information) of the imaging apparatus 100 from a state detector 107. The imaging condition information contains the F-number, the imaging distance, the focal length in the zoom lens in capturing the image, etc. The state detector 107 can obtain the imaging condition information directly from a system controller 110, and can obtain the imaging condition information on the imaging optical system 101 from an imaging optical system controller 106. A memory 108 stores the image restoration filter for the diffraction correction in the optical system that does not include the APF 111 (optical element). The memory 108 stores a plurality of image restoration filters depending on the F-number, or for each F-number, that corresponds to a quantized value of a concentration change (transmittance change) in the APF 111.

The image processor 104 reads, from the memory 108, the image restoration filters from the minimum F-number to the F-number in the imaging condition based on the light ray height in the imaging optical system 101 and the position of the APF 111 in the imaging optical system 101. A calculator 112 calculates the image restoration filters from the minimum F-number to the F-number in the imaging condition, and prepares the image restoration filter when the imaging optical system 101 includes the APF 111. The memory 108 stores the prepared image restoration filter. The memory 108 stores the light ray height at which each of the on-axis light flux and the off-axis light flux passes the APF 111 in the imaging optical system 101.

The image processor 104 includes a data selector 104a (acquirer), and an image processor 104b. When the imaging optical system 101 includes the APF 111, the data selector 104a selects one or more image restoration filters calculated by the calculator 112 (image restorer) according to the F-number in capturing an image for each of the on-axis light flux and the off-axis light flux. The data selector 104a selects a summed ratio and a weighted average ratio in calculating the image restoration filter of the APF 111 quantized according to the F-number. The image processor 104b generates a restored image based on a captured image with the image restoration filter calculated by the calculator 112 or the image restoration filter selected by the data selector 104a.

The output image (restored image) processed by the image processor 104 is recorded with a predetermined format in the image recording medium 109. A display device 105 displays an image that has received a predetermined display process and the image restoration process according to this embodiment. Alternatively, the display device 105 may display the image that has received a simplified process for a high-speed display. The system controller 110 performs a series of controls in the imaging apparatus 100. The imaging optical system controller 106 mechanically drives the imaging optical system 101 based on a command from the system controller 110.

The imaging optical system 101 may include an optical element, such as an optical low-pass filter and an infrared cut filter. When the image optical system 101 includes the optical element that affects the OTF characteristic, such as the optical low-pass filter, the influence may be considered in generating the image restoration filter. In this case, the image restoration filter is generated based on an OTF (second OTF) of the optical low-pass filter. The infrared cut filter also affects each PSF in the RGB channels as the integrated value of the PSF of the spectral wavelength, in particular the PSF of the R channel, and the influence may be considered in generating the image restoration filter. Since a pixel opening shape also affects the OTF, the influence may be considered. In this case, the image restoration filter is generated based on the OTF affected by the pixel opening shape.

In the imaging apparatus 100 according to this embodiment, the imaging optical system 101 is integrated with the imaging apparatus body that includes the image sensor 102, but the present invention is not limited to this embodiment. This embodiment is applicable to an imaging apparatus that includes an imaging apparatus body, such as a single-lens reflex camera, and an imaging optical system (interchangeable lens or lens apparatus) that can be attached to or detached from the imaging apparatus body.

First Embodiment

Referring now to FIG. 1, a description will be given of an image restoration process (image processing method) according to a first embodiment of the present invention. FIG. 1 is a flowchart of the image restoration process according to this embodiment, and a process for restoring the image degradation caused by the diffraction when the imaging optical system 101 includes the APF 111. The image processor 104 or the calculator 112 mainly executes each step in FIG. 1 based on the command from the system controller 110.

Initially, in step S101, the system controller 110 determines whether the imaging optical system 101 (imaging lens) includes the APF 111. This determination can be made by any one of mechanical and electric units. The system controller 110 may perform this determination according to the input of the photographer. Next, in step S102, the image processor 104 acquires image capturing information or the imaging condition information (imaging condition). The imaging condition information contains, but is not limited to, a type of the imaging optical system 101, a focal length, an F-number, and an object distance in capturing an image.

Next, in step S103, the image processor 104 (data selector 104a) selects the correction data (diffraction correction data) based on the imaging condition information, such as the F-number in capturing an image acquired in step S102. In other words, the data selector 104a selects (acquires) a plurality of image restoration filters (first image restoration filters) as the correction data based on the plurality of image restoration filters stored in the memory 108. At this time, the image restoration filter selected by the data selector 104a is the image restoration filter relating to the imaging optical system 101 that does not include the APF 111 (first image restoration filter that is generated without considering the influence of the APF 111). This image restoration filter (first image restoration filter) is the correction data necessary to generate the image restoration filter relating to the imaging optical system 101 that includes the APF 111 (the second image restoration filter that is generated by considering the influence of the APF 111). Next, in step S104, the image processor 104 (image processor 104b) acquires the plurality of image restoration filters (correction data) selected from the memory 108.

Next, in step S105, the calculator 112 performs a predetermined calculation process for the plurality of image restoration filters (correction data) acquired in the step S104. The image processor 104 (image processor 104b) acquires the image restoration filter (second image restoration filter) relating to the imaging optical system 101 that includes the APF 111, based on the calculation process result by the calculator 112. The acquired image restoration filter (second image restoration filter) is correction data (APF correction data) that is generated based on the influence of the diffraction by the APF 111. Next, in step S106, the image processor 104 (image processor 104b) performs the restoration process (diffraction correction process) for the captured image by using the image restoration filter (APF correction data) acquired in step S105. Next, in step S107, the image processor 104 (image processor 104b) outputs the image data after the restoration is processed (restored image or image in which the diffraction is corrected).

A description will now be given of the predetermined calculation process in step S105. A normalized value of the transmittance of each F-number described in FIG. 13 is convoluted with each spot diagram. At this time, it is necessary to normalize the spot diagram based on the ratio of the transmittance of each F-number by the stages corresponding to the quantized F-number and to prevent the combined spot diagram from exceeding the normalized value.

Next follows a description of a method for calculating a spherical aberration as a wavefunction based on the spot diagram. A pupil function and a point amplitude function are connected to each other by a Fourier transform. Based on the intensity distributions of the two functions having the Fourier transform relationship, a phase restoration algorithm of Gerchberg and Saxton used to calculate each phase distribution is applied to a restoration calculation of a wavefront aberration.

Figure 15:
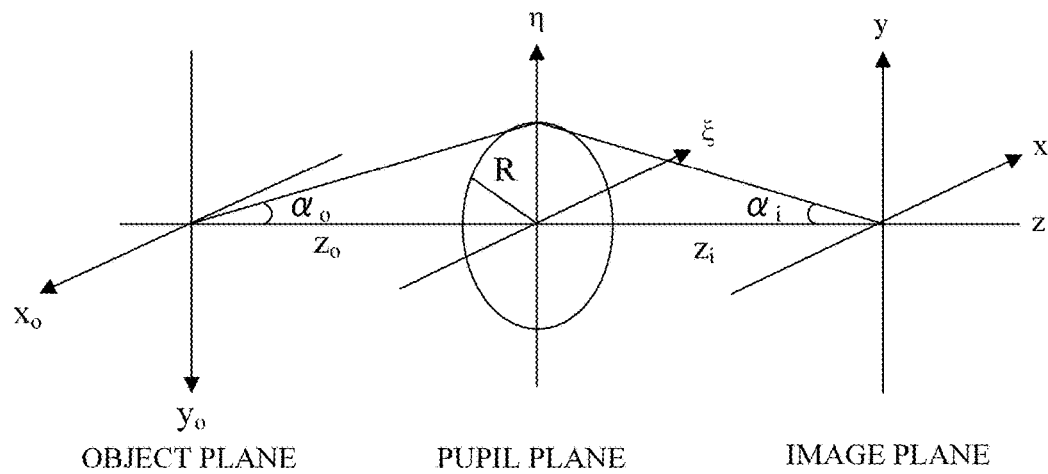
FIG. 15 is an explanatory view of an imaging optical system according to the first embodiment.

Assume the imaging optical system as in FIG. 15, where (xo, yo), (x, y) and (ξ, η) are converted coordinates of the image plane, the object plane, and the pupil plane, respectively. (Xo, Yo) and (X, Y) are real coordinates on the object plane and the image plane, respectively. Then, the following expressions (8) are satisfied:

$$\begin{cases} xo = k*Xo*no*\mathrm{Sin}\alpha o \\ yo = k*Yo*no*\mathrm{Sin}\alpha o \\ x = kX*ni*\mathrm{Sin}\alpha i \\ y = kY*ni*\mathrm{Sin}\alpha i \end{cases} \quad (8)$$

In the expressions (8), no and ni are refractive indexes of media on the object side and the image side, respectively, αo and αi are aperture angles on the object side and image side, respectively, and k=2π/λ, where λ is a wavelength. In addition, where (a, b) is an actual coordinate on the pupil plane, and R is a radius on the pupil, the following expression (9) is established:

$$\xi = \frac{a}{R\eta} = b/R. \qquad (9)$$

The pupil function is defined as follows:

$$f(\xi,\eta)=|f(\xi,\eta)|\exp(ikW(\xi,\eta)) \qquad (10).$$

In the expression (10), $|f(\xi, \eta)|$ is an amplitude transmittance of the pupil, and $W(\xi, \eta)$ is a wavefront aberration. It is conventionally known that the point amplitude spread ha(x, y) and the point intensity spread $|ha(x, y)|^2$ are calculated where the spreads of the object point and the image point are sufficiently smaller than an object distance Zo and an image distance Zi and the aperture is small. On the contrary, given the point intensity spread, it is not easy to calculate the pupil function. When the amplitude transmittance $|f(\xi, \eta)|$ of the pupil and the point intensity spread $|ha(x, y)|^2$ are known, a description will be given of a method for calculating the wavefront aberration $W(\xi, \eta)$ corresponding to the phase component in the pupil function.

Figure 16:
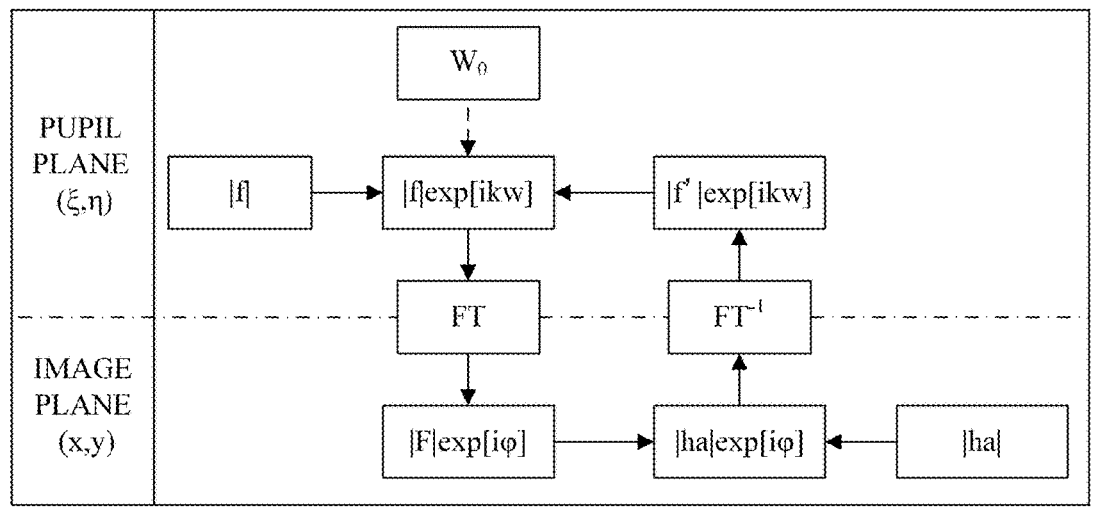
FIG. 16 is an explanatory view of a calculation algorithm according to the first embodiment.

A description will now be given of the calculation algorithm illustrated in FIG. 16.

Initially, in step 1, assume a random number that distributes from −π to π as an initial phase $kW0(\xi, \eta)$, a complex amplitude spread is made on the pupil plane in which the phase term is added to the known amplitude transmittance as expressed by the following expression (11):

$$f1(\xi,\eta)=|f(\xi,\eta)|\exp(ikW0(\xi,\eta)) \qquad (11).$$

Next, in step 2, the expression (11) is Fourier-transformed. Where F1(x, y) is the resultant function and φ(x, y) is its phase component, the following expression (12) is established:

$$F1(\xi,\eta)=|F1(x,y)|\exp(i\varphi(x,y)) \qquad (12).$$

Next, in step 3, the phase term in the expression (12) is maintained and the absolute value component is replaced with $|ha(x, y)|$ calculated based on the known point intensity spread. Thus, F1'(x, y) is obtained on the image plane using expression (13):

$$F1'(x,y)=|ha(x,y)|\exp(i\varphi(x,y)) \qquad (13).$$

Next, in step 4, the expression (13) is Fourier-transformed. The obtained function f1'(ξ, η) can be expressed as follows, where kW1(ξ, η) is the phase component:

$$f1'(\xi,\eta)=|f1(\xi,\eta)|\exp(ikW1(\xi,\eta)) \qquad (14).$$

Next, in step 5, the phase term in the expression (14) is maintained, and the absolute component is replaced with the known $|f(\xi, \eta)|$, and the following expression (15) is obtained:

$$f2(\xi,\eta)=|f(\xi,\eta)|\exp(ikW1(\xi,\eta)) \qquad (15).$$

The above procedure constitutes one loop, and the square error can be obtained on the pupil plane expressed by the following expression (16) through the similar calculations:

$$\varepsilon=\iint||f(\xi,\eta)|-|f1'(\xi,\eta)||^2 d\xi d\eta \qquad (16).$$

Steps 2 to 5 are repeated until the value in the expression (16) converges to the predetermined value or smaller. After the loop calculation is repeated ∞ times, the restored wavefront aberration $W\omega(\xi, \eta)$ can be obtained. The wavefront aberration is a wavefunction and is converted into the PSF.

In this embodiment, the diaphragm 101a in the imaging apparatus 100 is configured to change the F-number from F2.8 to F128. In general, the F-number from F2.8 to F22 corresponds to the area in FIG. 6A in which the gain of the image restoration filter monotonously increases. The gain characteristic in the image restoration filter increases on the low frequency side according to the F-number from F22 to F32, and the gain characteristic does not increase on the high frequency side according to the F-number from F22 to F32. Referring to FIGS. 6A to 6C, the image restoration filter generated by interpolations of discrete F-numbers in the transition state from FIG. 6A to FIG. 6B cannot provide a highly accurate image restoration process. The F-number from F32 to F91 corresponds to the state in FIG. 6B and thus the accuracy can be maintained even when the image restoration filter is held every stage. The F-number from F91 to F128 corresponds to the state in FIG. 6C, and the gain of the image restoration filter for F128 is one or less. Therefore, the image restoration filter for F128 is substantially prevented from being used by setting the interpolation ratio to one.

Figure 9:
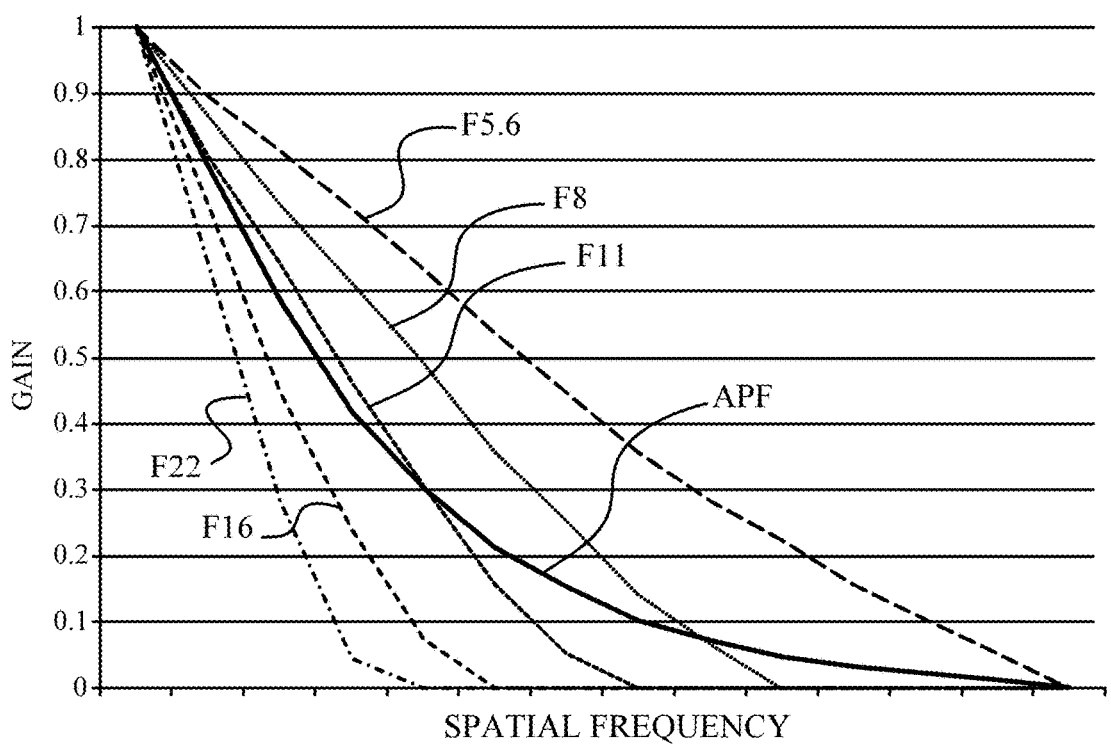
FIG. 9 is a schematic view of the OTF in the apodizing filter according to the first embodiment.

FIG. 9 is a schematic view of the OTF in the APF 111 (the OTF in an ideal lens having the APF 111) according to this embodiment. In FIG. 9, the ordinate axis denotes a gain (response), and the abscissa axis denotes a spatial frequency. A highly accurate image restoration process can be performed so as to ideally correct the OTF illustrated in FIG. 9.

Figure 10:
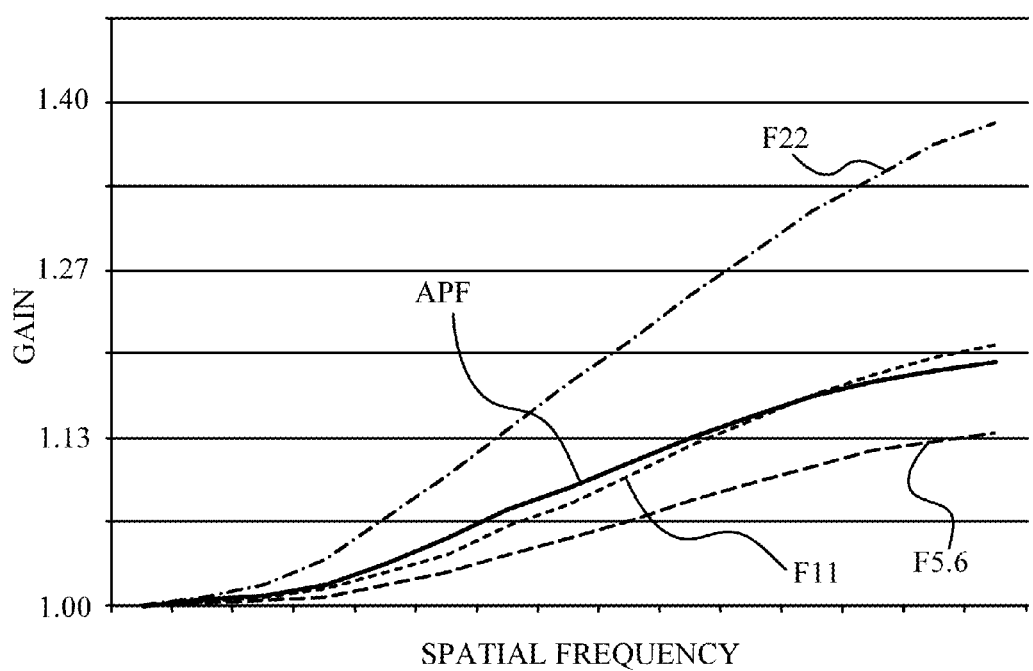
FIG. 10 is a schematic view of the gain characteristic in the image restoration filter according to the first embodiment.

FIG. 10 is a schematic view of the gain characteristic of the image restoration filter according to this embodiment. It is understood that the gain characteristic (solid line) of the image restoration filter generated by calculating the plurality of image restoration filters for F5.6, F8, F11, F16, and F22, and the gain characteristic (thin dotted line) of the image restoration filter for F11 are close to each other. It is understood that the correction gain of the image captured with the imaging optical system 101 that includes the APF 111 overlaps the solid line in the APF in FIG. 10, and the interpolation accuracy is high in this example. A data amount is reduced by calculating the plurality of image restoration filters (first image restoration filters) without holding the image restoration filter (second image restoration filter) corresponding to the APF 111.

This embodiment can save the data amount of the image restoration filter held in the imaging apparatus without degrading the accuracy of the image restoration process.

Second Embodiment

Figure 11:
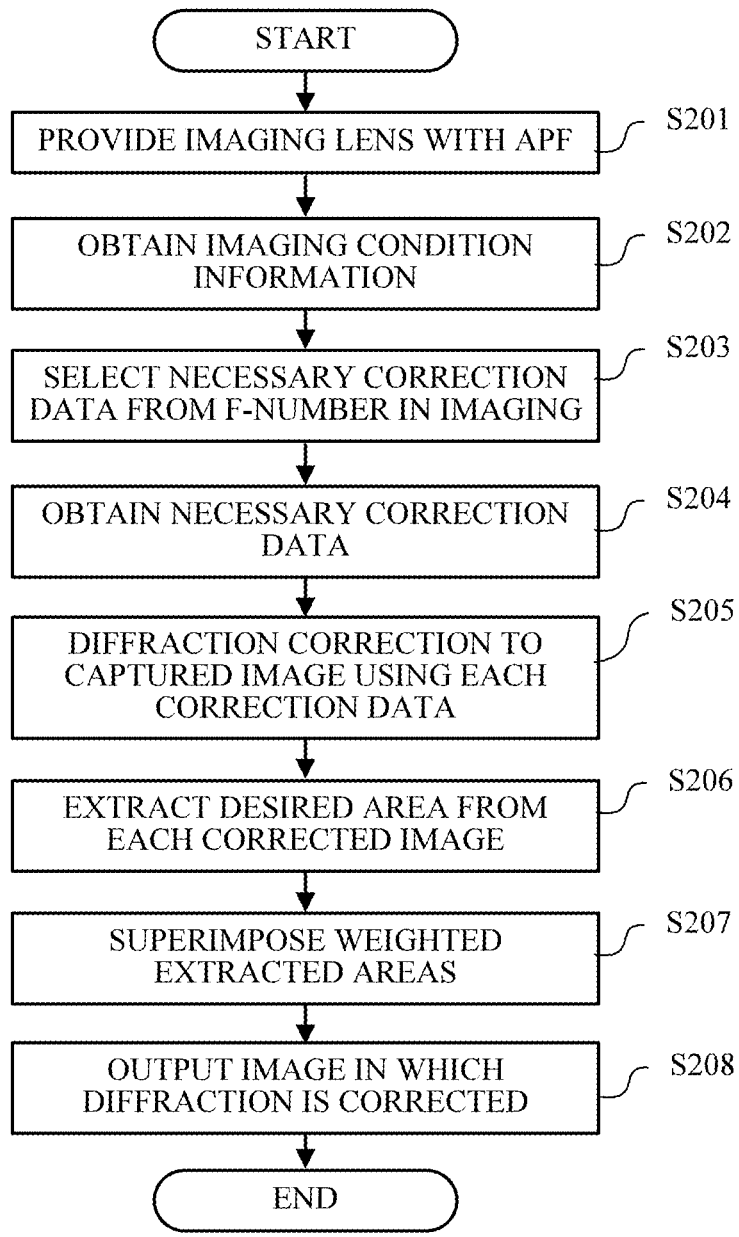
FIG. 11 is a flowchart of an image restoration process according to a second embodiment.

Referring now to FIG. 11, a description will be given of an image restoration process according to a second embodiment of the present invention. FIG. 11 is a flowchart of the image restoration process according to this embodiment so as to restore the image degradation caused by the diffraction where the imaging optical system 101 includes the APF 111. The image processor 104 or the calculator 112 mainly executes each step in FIG. 11 based on the command from the system controller 110. Since steps S201 to S204 and S208 in FIG. 11 are similar to steps S101 to S104 and S107 in FIG. 1 described in the first embodiment, the description thereof will be omitted.

In step S205, the image processor 104 (image processor 104b) generates the restored image (corrected image) by the restoration process (diffraction correction process) for the captured image using the plurality of image restoration filters (first image restoration filters) obtained in the step S204. The image processor 104b performs the restoration process (restoration correction process) to the captured image by the stage number corresponding to the quantized concentration (transmittance) in the APF 111, and generates a plurality of corrected images (intermediate images).

Next, in step S206, the image processor 104 (image processor 104b) divides each of the plurality of intermediate images into a plurality of areas, generated by a diffraction correction process by the stage number corresponding to the quantized concentration of the APF 111. The image processor 104b extracts a desired area from among a plurality of divided areas. The image processor 104b weights and calculates a working amount of the APF 111 for each area. The area may be divided for each pixel unit, but may be divided for an area of some pixels if there is no real harm. Each area is weighted that relates to the stage corresponding to the quantized concentration in the transmission area by calculating the transmission area of the APF 111 through ray tracing in the coordinate representative of each area.

Next, in step S207, the image processor 104 (image processor 104b) superimposes corresponding areas (divided areas) in the plurality of images (intermediate images) according to a weight. The plurality of images refers to captured images that change according to the F-number. Each image with a different F-number is captured with a different resolving quality under the influences of a variety of aberrations and diffractions. The diffraction correction process is performed for each of these images, and the images corresponding to the quantized stage number are calculated. The divided area is ideally an area divided for each pixel, but may be an area divided for a plurality of pixels for the combination if the influence is small. A weight is the number of divisions corresponding to the quantized stage number in the APF 111 and a transmittance ratio for each F-number. Thus, the image processor 104b prepares the image that reflects the APF effect by combining the images for respective F-numbers with one another based on the transmittance ratio. The image processor 104b connects the superimposed divided areas (a plurality of areas) to one another, and generates the image (restored image) to which the diffraction correction process is applied to the entire surface. Next, in step S208, the image processor 104 (image processor 104b) outputs the restored image data (restored image).

The image restoration process according to this embodiment does not include the step of performing a FFT for a PSF in the image restoration filter, and can more effectively reduce a calculation load by superimposing pure pixels and generating the restored image. This embodiment can save a data amount for the image restoration filter stored in the imaging apparatus without degrading the accuracy in the image restoration process.

Hence, in each embodiment, the image processing apparatus includes a memory 108, an acquirer (data selector 104a), and an image restorer (image processor 104b and the calculator 112). The memory stores a plurality of image restoration filters depending on the F-number. The acquirer can acquire the plurality of first image restoration filters according to the imaging condition from among a plurality of image restoration filters. The image restorer performs a predetermined calculation process based on the plurality of first image restoration filters, and performs a restoration process for the image obtained via the imaging optical system that includes an optical element that changes the transmittance.

The plurality of first image restoration filters may relate to the imaging optical system that does not include the optical element. The optical element may be an apodizing filter in which the transmittance continuously changes in the radial direction from the center on the optical plane.

Other Embodiments

Embodiments of the present invention can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-Ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) a memory configured to store a plurality of image restoration filters depending on an F-number; and
   (B) at least one processor coupled to the memory, and serving as:
   (a) an acquirer configured to acquire a plurality of first image restoration filters, according to an imaging condition, from among the plurality of image restoration filters; and
   (b) an image restorer configured to perform a restoration process for an image through a predetermined calculation process based on the plurality of first image restoration filters, the image being obtained via an imaging optical system that includes an optical element having a transmittance distribution where a transmittance continuously changes in at least a partial area,
   wherein the plurality of first image restoration filters are image restoration filters relating to an imaging optical system that does not include the optical element.

2. The image processing apparatus according to claim 1, wherein the image restorer generates a second image restoration filter relating to the imaging optical system that includes the optical element, by performing the predetermined calculation process based on the plurality of first image restoration filters, and wherein the image restorer performs the restoration process for the image with the second image restoration filter.

3. The image processing apparatus according to claim 1, wherein the image restorer performs the restoration process for the image based on the plurality of first image restoration filters selected according to the F-number in capturing the image.

4. The image processing apparatus according to claim 1, wherein the image restorer performs the restoration process so as to reduce a degradation of the image by a diffraction.

5. The image processing apparatus according to claim 1, wherein the imaging condition contains the F-number, an imaging distance, and a focal length in capturing the image.

6. An image processing apparatus comprising:
(A) a memory configured to store a plurality of image restoration filters depending on an F-number; and
(B) at least one processor coupled to the memory, and serving as:
 (a) an acquirer configured to acquire a plurality of first image restoration filters, according to an imaging condition, from among the plurality of first image restoration filters; and
 (b) an image restorer configured to perform a restoration process for an image through a predetermined calculation process based on the plurality of first image restoration filters, the image being obtained via an imaging optical system that includes an optical element having a transmittance distribution where a transmittance continuously changes in at least a partial area, the optical element being an apodizing filter that continuously changes the transmittance along a radial direction from a center on an optical plane where a transparent member is set to a substrate.

7. The image processing apparatus according to claim 6, wherein the memory stores the plurality of image restoration filters for each F-number corresponding to a transmittance obtained by quantizing the transmittance of the optical element.

8. The image processing apparatus according to claim 6, wherein the image restorer performs the restoration process for the image based on the plurality of first image restoration filters selected according to the F-number in capturing the image.

9. The image processing apparatus according to claim 6, wherein the image restorer performs the restoration process so as to reduce a degradation of the image by a diffraction.

10. An image processing apparatus comprising:
(A) a memory configured to store a plurality of image restoration filters depending on an F-number; and
(B) at least one processor coupled to the memory, and serving as:
 (a) an acquirer configured to acquire a plurality of first image restoration filters, according to an imaging condition, from among the plurality of image restoration filters; and
 (b) an image restorer configured to perform a restoration process for an image through a predetermined calculation process based on the plurality of first image restoration filters, the image being obtained via an imaging optical system that includes an optical element having a transmittance distribution where a transmittance continuously changes in at least a partial area, wherein the image restorer generates a plurality of intermediate images based on the plurality of first image restoration filters, divides each of the plurality of intermediate images into a plurality of areas, weights the plurality of areas that are divided, and performs the restoration process for the image by connecting the plurality of areas that are weighted.

11. The image processing apparatus according to claim 10, wherein the image restorer performs the restoration process for the image based on the plurality of first image restoration filters selected according to the F-number in capturing the image.

12. The image processing apparatus according to claim 10, wherein the image restorer performs the restoration process so as to reduce a degradation of the image by a diffraction.

13. An imaging apparatus comprising:
(A) an image sensor configured to output image data by photoelectrically converting an optical image formed via an imaging optical system;
(B) a memory configured to store a plurality of image restoration filters depending on an F-number; and
(C) at least one processor coupled to the memory, and serving as:
 (a) an acquirer configured to acquire a plurality of first image restoration filters, according to an imaging condition, from among the plurality of image restoration filters; and
 (b) an image restorer configured to perform a restoration process for an image through a predetermined calculation process based on the plurality of first image restoration filters, the image being obtained via the imaging optical system that includes an optical element having a transmittance distribution where a transmittance continuously changes in at least a partial area,
wherein the plurality of first image restoration filters are image restoration filters relating to an imaging optical system that does not include the optical element.

14. An image processing method comprising the steps of:
acquiring a plurality of first image restoration filters, from a plurality of image restoration filters, according to an imaging condition; and
performing a restoration process for an image through a predetermined calculation process based on the plurality of first image restoration filters, the image being obtained via an imaging optical system that includes an optical element having a transmittance distribution where a transmittance continuously changes in at least a partial area,
wherein the plurality of first image restoration filters are image restoration filters relating to an imaging optical system that does not include the optical element.

15. A non-transitory computer-readable storage medium for storing an image processing method that includes the steps of:
acquiring a plurality of first image restoration filters, from a plurality of image restoration filters, according to an imaging condition; and
performing a restoration process for an image through a predetermined calculation process based on the plurality of first image restoration filters, the image being obtained via an imaging optical system that includes an optical element having a transmittance distribution where a transmittance continuously changes in at least a partial area, wherein the plurality of first image restoration filters are image restoration filters relating to an imaging optical system that does not include the optical element.

16. An imaging apparatus comprising:
(A) an image sensor configured to output image data by photoelectrically converting an optical image formed via an imaging optical system;
(B) a memory configured to store a plurality of image restoration filters depending on an F-number; and
(C) at least one processor coupled to the memory, and serving as:
  (a) an acquirer configured to acquire a plurality of first image restoration filters, according to an imaging condition, from among the plurality of image restoration filters; and
  (b) an image restorer configured to perform a restoration process for an image through a predetermined calculation process based on the plurality of first image restoration filters, the image being obtained via the imaging optical system that includes an optical element having a transmittance distribution where a transmittance continuously changes in at least a partial area, the optical element being an apodizing filter that continuously changes the transmittance along a radial direction from a center on an optical plane where a transparent member is set to a substrate.

17. An image processing method comprising the steps of:
acquiring a plurality of first image restoration filters, from a plurality of image restoration filters, according to an imaging condition; and
performing a restoration process for an image through a predetermined calculation process based on the plurality of first image restoration filters, the image being obtained via an imaging optical system that includes an optical element having a transmittance distribution where a transmittance continuously changes in at least a partial area, the optical element being an apodizing filter that continuously changes the transmittance along a radial direction from a center on an optical plane where a transparent member is set to a substrate.

18. An imaging apparatus comprising:
(A) an image sensor configured to output image data by photoelectrically converting an optical image formed via an imaging optical system;
(B) a memory configured to store a plurality of image restoration filters depending on an F-number; and
(C) at least one processor coupled to the memory, and serving as:
  (a) an acquirer configured to acquire a plurality of first image restoration filters, according to an imaging condition, from among the plurality of image restoration filters; and
  (b) an image restorer configured to perform a restoration process for an image through a predetermined calculation process based on the plurality of first image restoration filters, the image being obtained via the imaging optical system that includes an optical element having a transmittance distribution where a transmittance continuously changes in at least a partial area, wherein the image restorer generates a plurality of intermediate images based on the plurality of first image restoration filters, divides each of the plurality of intermediate images into a plurality of areas, weights the plurality of areas that are divided, and performs the restoration process for the image by connecting the plurality of areas that are weighted.

19. An image processing method comprising the steps of:
acquiring a plurality of first image restoration filters, from a plurality of image restoration filters, according to an imaging condition; and
performing a restoration process for an image through a predetermined calculation process based on the plurality of first image restoration filters, the image being obtained via an imaging optical system that includes an optical element having a transmittance distribution where a transmittance continuously changes in at least a partial area,
wherein, in the step of performing the restoration process, a plurality of intermediate images are generated based on the plurality of first image restoration filters, each of the plurality of intermediate images is divided into a plurality of areas, the plurality of areas that are divided are weighted, and the restoration process for the image is performed by connecting the plurality of areas that are weighted.

* * * * *